United States Patent [19]

Siegel et al.

[11] Patent Number: 4,763,349
[45] Date of Patent: Aug. 9, 1988

[54] MONITORING APPARATUS USING TELEPHONE LINK

[76] Inventors: Howard Siegel, 3095 Lawson Blvd., Oceanside, N.Y. 11572; Theodore Simon, 35 Melrose Rd., Dix Hills, N.Y. 11746; Barry D. Schweiger, 9 Richbourn La., Melville, N.Y. 11747

[21] Appl. No.: 36,337

[22] Filed: Apr. 9, 1987

Related U.S. Application Data

[63] Continuation of Ser. No. 336,408, Dec. 31, 1981, abandoned.

[51] Int. Cl.$^4$ .................... H04M 11/04; H04M 1/60
[52] U.S. Cl. ................................. 379/38; 379/106; 379/389
[58] Field of Search .............. 381/86; 379/37–39, 379/40, 42, 44, 45, 51, 106, 388–390

[56] References Cited

U.S. PATENT DOCUMENTS

| | | |
|---|---|---|
| 3,725,585 | 4/1973 | Moniak et al. |
| 3,800,089 | 3/1974 | Reddick |
| 3,985,976 | 10/1976 | Cowpland et al. |
| 4,172,967 | 10/1979 | Porter et al. |
| 4,338,493 | 7/1982 | Stenhuis et al. .................... 379/38 |
| 4,467,142 | 8/1984 | Rupp et al. .......................... 379/45 |

FOREIGN PATENT DOCUMENTS 2903459 8/1979 Fed. Rep. of Germany.
7905018 12/1980 Netherlands.

OTHER PUBLICATIONS

Lennstrom et al., "Ericare", Ericsson Review, vol. 58, No. 2, 1981, pp. 96–100, received by PTO 12/15/81.

Primary Examiner—Keith E. George

[57] ABSTRACT

Two-way telephone communication is established between a subscriber-dwelling and a remote station using the automatic dialer of existing security apparatus. A speaker and a microphone are placed in the dwelling. A diplexer electrically coupled to the automatic dialer and responsive to a tone of a given frequency, operates a switch which selectively applies either the microphone or the speaker to the audio circuitry of the dialer. When the dialer is triggered, the switch couples the microphone to the audio circuitry of the dialer whereby sounds in the dwelling are communicated to the remote station. When an employee at the remote station applies the tone to the link, the diplexer causes the switch electrically to isolate the microphone and couple the speaker to the dialer whereby the employee of the station can communicate with the dwelling. Alternate operation of either the speaker or microphone prevents accoustical feedback between the two.

1 Claim, 1 Drawing Sheet

MONITORING APPARATUS USING TELEPHONE LINK

This is a continuation of application Ser. No. 336,408, filed Dec. 31, 1981, now abandoned.

This invention relates to a telephone monitor to be used between a subscriber-dwelling and a remote monitoring station, and more particularly, it relates to an emergency communication system which is adapted to use the automatic dialer and telephone link established by a conventional security system.

BACKGROUND OF THE INVENTION

Several alarm systems are in use wherein a break-in activates an automatic dialer mechanism sending a signal to a remote monitoring station. The nature of this arrangement automatically identifies the dwelling placing the call, whereupon appropriate security measures are taken. Since the link between the dwelling phone and remote station already exists or is easily established, it would seem desirable to use the same in providing two-way emergency communication. If an emergency arose, it would then be possible to provide two-way communication over the link allowing the nature of the emergency to be assessed.

However, merely placing an active microphone and active speaker on an established telephone link could create problems such as acoustical feedback, hum pickup or instability.

SUMMARY OF THE INVENTION

The present invention overcomes many of the problems noted above. In general, the present invention comprises means coupled to the automatic telephone dialer of the security apparatus and which is adapted to be activated when the dialer establishes a link to the remote station. A microphone and a speaker are placed in the dwelling. The speaker and microphone are electrically coupled through a switch into the dialer and link. The switch is controlled by the aforesaid means whereupon once the dialer is activated, the output of the microphone is amplified and applied to the telephone link whereby sounds in the dwelling are communicated to the remote station. When a tone of a given frequency is applied to the link, the aforesaid means responds thereto and causes the switch electrically to isolate the microphone and activate the speaker. Audio signals from the telephone link are then amplified and applied to the speaker thus establishing two-way communications between the subscriber-dwelling and remote station.

OBJECTS OF THE INVENTION

It is, therefore, an object of the present invention to provide a two-way communications link that can be used with the auto-dialer of a conventional security system.

It is a further object of the present invention to provide a communications link between a subscriber-dwelling and a remote central station wherein once the link is established the central station and remote dwelling can communicate interactively without the former having to perform any manual switching functions.

It is another object of the present invention to provide a two-way communications link over an existing telephone line which is responsive to the tone of a given frequency and which operates without the possibility of acoustical feedback and associated instabilities.

It is another object of the present invention to provide a communications link between a subscriber-dwelling and a remote station wherein interactive voice communication between the two allows the occupant of the dwelling to report orally the nature of the emergency, and wherein the station attendant can provide needed instruction.

Other objects and features of the present invention will become apparent from the following detailed description considered in connection with the accompanying drawing. It is to be understood, however, that the drawing is designed for purposes of illustration only and not as a definition of the limits of the invention, for which reference should be made to the appending claims.

BRIEF DESCRIPTION OF THE DRAWING

In the drawing, wherein the same reference numeral denotes the same element.

DETAILED DESCRIPTION OF THE PREFERRED EMBODIMENT

Figure 1:
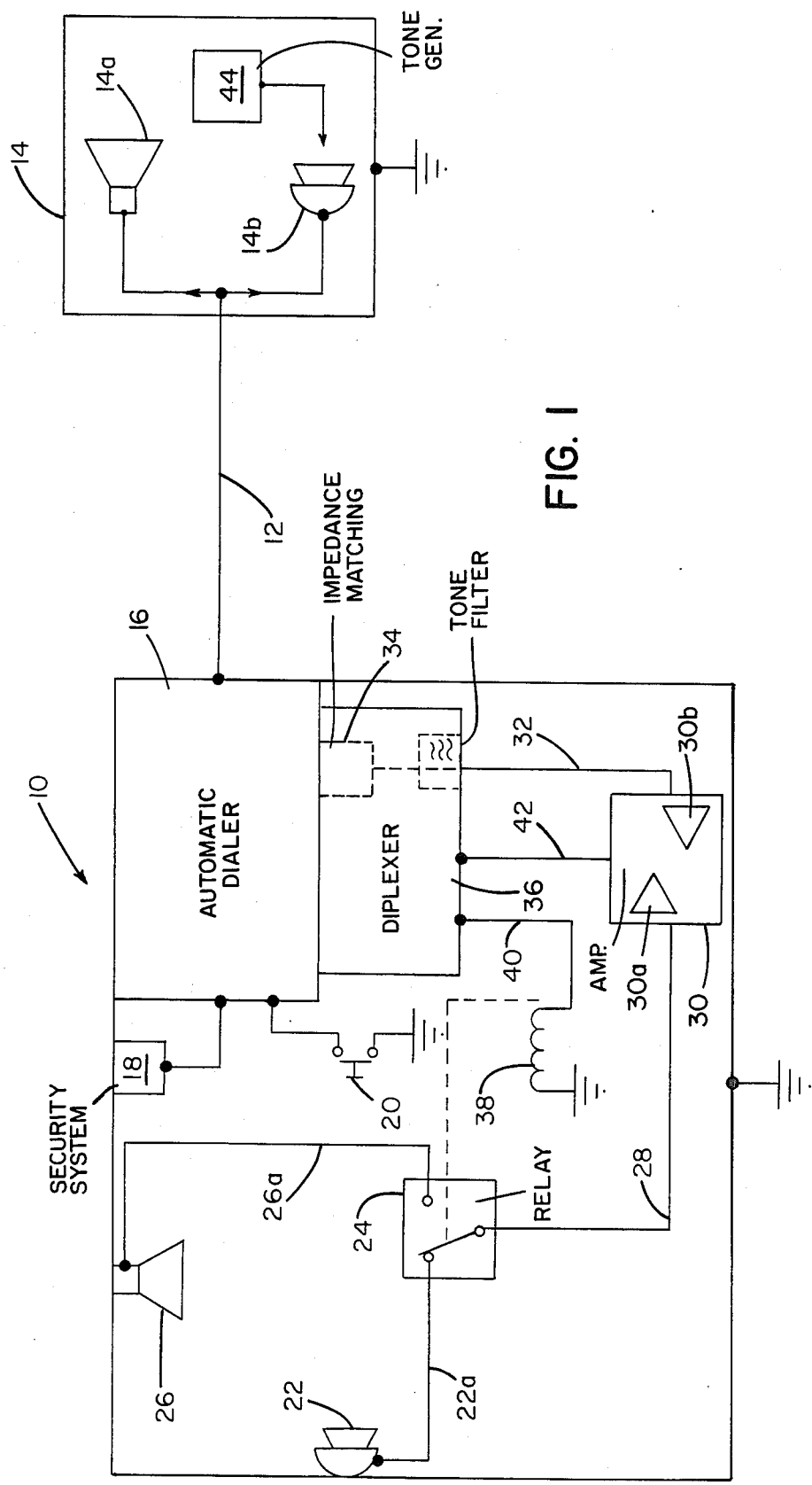
FIG. 1 is a diagrammatic representation of the inventive system.

A station or subscriber-dwelling, indicated generally by reference numeral 10, is adapted to be electrically coupled to a remote monitoring station 14 by means of a telephone line or line 12. Station 10 includes a conventional automatic dialer 16 and a conventional home security system 18 comprised of break-in sensing apparatus, and of sending apparatus not shown, as is well known in the art. Security system 18 further includes a so-called "panic button" 20 for manual activation of the apparatus. In conventional manner, and when sensing apparatus 18 is triggered, automatic dialer 16 dials an appropriate number, thus establishing a link to remote monitoring station 14 and identifying the dwelling making the call. In the last mentioned station, an employee will be altered to the establishment or making of link 12, whereupon appropriate action will be taken.

In accord with the present invention, one or a plurality of microphones 22 are placed in dwelling 10 at a strategic location. The output of each microphone is applied along a signal lead 22a to a switching circuit 24, about which more is said below. One or a plurality of speakers 26 are also placed strategically in dwelling 10. Each speaker is coupled to switch means 24 by means of respective signal leads 26a. A signal lead 28 from switch means 24 is coupled to one side of amplifier means 30, comprised of a microphone amplifier 30a, and a speaker amplifier-driver 30b. A signal lead 32 electrically couples the other side of amplifier means 30 to interface means 34. The last mentioned means provides impedence transformation and electrical connection to auto-dialer 16.

A diplexer tone-filter and driver 36, responsive to a tone of a given frequency, is electrically coupled to auto-dialer 16 and is adapted to receive a tone therethrough. A solenoid 38, designed to operate switch 24, is electrically coupled to means 36 along a lead 40. Means 36 controls operation of amplifier 30, or, more specifically, controls the operation of amplifier 30a and 30b, by means of a lead 42, as shown. Means 36 provides tandem operation between amplifier 30 and switch 24 during use and operation of the invention, as will be described now.

In use and operation, and upon an emergency situation, manually-operated button 20 is activated. This causes dialer 16 automatically to activate and dial a pre-programmed number, whereupon link 12 is established to remote station 14. When link 12 is established, means 36 automatically activates microphone amplifier 30a by means of lead 42. It will be noticed when viewing the FIGURE that switch means 24 normally couples the output from microphone 22 to lead 28 for high gain amplification by amplifier 30a while at the same time, switch means 24 electrically isolates speaker 26 from signal lead 28. Signal lead 32 applies the audio output of amplifier 30a to impedance matching means 34. The last-mentioned means provides appropriate impedance transformation for efficient coupling of the audio signal into dialer 16. Link 12 applies this audio signal to remote station 14 and into speaker 14a thereof, thus establishing a voice link thereto. To get control of link 12 and to allow the station employee to speak into dwelling 10, the station employee applies a tone of a given frequency, from a tone generator 44, into station microphone 14b. Microphone 14b couples the tone into link 12 for communication into dialer 16 and means 36. Means 36 responds to the tone and activates relay coil 38 by sourcing or sinking an appropriate current along lead 40. Coil 38 activates switching means 24, whereby the latter electrically isolates microphone lead 22a and applies by electrically coupling leads 28 and 26a. As this occurs, and the output of amplifier 30b to speaker 26, during the time the tone is applied to the link, means 36 also activates speaker amplifier 30b thus establishing a voice link from station 14 and microphone 14b thereof into dwelling 10 and speaker 26 thereat. Means 36 also filters and provides a termination for the tone so that the same will not interfere with voice communication.

It will be noted that when speaker 26 is on, switch means 24 automatically deactivates microphone 22, and, alternatively, when switch means 24 activates microphone 22, speaker 26 is deactivated. With this arrangement, acoustical feedback problems between speaker and microphone are eliminated. Moreover, the station employee, by applying the tone as aforesaid, controls the remote switching of either the speaker or microphone. This design eliminates the need for manual operation of these switching functions by the party in dwelling 10. And, it will be apparent that button 20 may be activated remotely by means of an RF, Infra-red, or sonic link.

While only one embodiment of the present invention has been shown and described, it is to be understood that many changes and mofifications can be made hereto without departing from the spirit and scope thereof.

What is claimed is:

1. Apparatus to establish two-way communications between a dwelling and a remote monitoring station using a telephone link and an existing automatic telephone dialer in the dwelling, comprising a microphone adapted to pick up sounds in the dwelling, a speaker placed in the dwelling, transfer means for effecting alternate, isolated connection of said microphone and said speaker to said telephone link, diplexer means electrically coupled to the dialer and responsive to a tone of a given frequency transmitted through said telephone link to activate said transfer means selectively to connect said microphone and speaker to said telephone link, microphone amplifier means between said microphone and said telephone link and adapted to amplify the output of said microphone, speaker driver means adapted to amplify signals from the telephone link and drive said speaker, and filter means for removing by filtering said tone of given frequency from said microphone amplifier means and said speaker driver means, said transfer means comprising an electromechanical relay having two contact positions, one of said positions connecting said microphone to said microphone amplifier means, the second contact position connecting said speaker to said speaker driver means, and means for selectively activating one of said microphone amplifier means and said speaker driver means, said electromechanical relay means and said selective activation means being operable simultaneously such that upon an emergency and the automatic operation of the dialer, a telephone link is established between the remote station and dwelling whereby said transfer means electrically couples one of said microphone and speaker to said diplexer means and electrically isolates the other of said microphone and speaker so that signals from the microphone are amplified by said microphone amplifier means and coupled into the link for transmission therethrough and signals from said remote station are amplified by said speaker driver means and broadcast by said speaker, thus establishing alternating voice communications between the dwelling and the remote station without interference by said tone previously removed by said filter means.

* * * * *